(12) United States Patent
Körner et al.

(10) Patent No.: US 6,969,336 B1
(45) Date of Patent: Nov. 29, 2005

(54) TRANSMISSION UNIT (75) Inventors: Tillmann Körner, Zang (DE); Hans-Peter Eubler, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 1 day.

(21) Appl. No.: 10/070,784

(22) PCT Filed: Sep. 7, 2000

(86) PCT No.: PCT/EP00/08754

§ 371 (c)(1),
(2), (4) Date: Jun. 4, 2002

(87) PCT Pub. No.: WO01/20195

PCT Pub. Date: Mar. 22, 2001

(30) Foreign Application Priority Data

Sep. 14, 1999 (DE) .......................... 299 16 006 U
Aug. 29, 2000 (DE) .............................. 100 42 475

(51) Int. Cl.[7] .......................... F16H 57/08; F16H 48/12
(52) U.S. Cl. .......................... 475/343; 475/336; 74/650
(58) Field of Search ................................ 475/343, 336, 475/273; 74/650

(56) References Cited

U.S. PATENT DOCUMENTS

| 873,681 | A | * | 12/1907 | Pendleton | 475/273 |
| 1,289,531 | A | * | 12/1918 | Parsons | 74/390 |
| 1,333,729 | A | * | 3/1920 | Pollard | 475/154 |
| 2,910,882 | A | | 11/1959 | Wellauer | 180/226 |
| 3,226,987 | A | * | 1/1966 | McCarty | 74/15.63 |
| 3,803,834 | A | | 4/1974 | Reese | 58/152 R |
| 3,942,387 | A | | 3/1976 | Stone et al. | 74/417 |
| 3,953,970 | A | * | 5/1976 | Fuehrer et al. | 60/337 |
| 4,148,262 | A | * | 4/1979 | Eichinger | 105/131 |
| 4,306,513 | A | * | 12/1981 | Legrand | 114/144 C |
| 4,463,823 | A | | 8/1984 | Tsuboi | |
| 4,553,624 | A | | 11/1985 | Yoshii | 180/225 |
| 4,643,687 | A | * | 2/1987 | Yano et al. | 440/75 |
| 5,509,863 | A | * | 4/1996 | Mansson et al. | 475/273 |
| 5,802,918 | A | * | 9/1998 | Chen et al. | 74/416 |
| 5,894,718 | A | * | 4/1999 | Hawlas et al. | 56/341 |
| 5,946,984 | A | | 9/1999 | Nitsche et al. | 74/733.1 |
| 5,951,434 | A | * | 9/1999 | Richards et al. | 475/284 |
| 6,524,208 | B1 | | 2/2003 | Hollermann et al. | 475/91 |

FOREIGN PATENT DOCUMENTS

CA          1 211 300          9/1986

(Continued)

*Primary Examiner*—Tisha Lewis
(74) *Attorney, Agent, or Firm*—Baker & Daniels (57) ABSTRACT

A transmission unit (1) comprising a transmission input shaft (F) and a transmission output shaft (A) as well as a transmission basic unit (25), which is arranged between the transmission input shaft and the transmission output shaft, and which is coupled to an angular drive (4). The angular drive comprises a first bevel gear (8) a second bevel gear (9), whereby the second bevel gear can be coupled to the transmission output shaft in indirect rotationally fixed manner. The transmission unit is enclosed by a transmission case, which comprises at least one basic transmission case (6) that encloses the transmission basic unit—and a transmission case part (7) that at least partially encloses the angular drive. The first bevel gear of the angular drive and a transmission element are directly interconnected in a rotationally fixed manner and are arranged next to one another in a spatially close manner. As a result, the transmission basic unit does not require elements for generating an axial force that supports the case cover on the wall of the case.

19 Claims, 4 Drawing Sheets

FOREIGN PATENT DOCUMENTS

| | | |
|---|---|---|
| DE | 902 699 | 1/1954 |
| DE | 1 284 804 | 12/1968 |
| DE | 2 358 778 | 3/1974 |
| DE | 196 50 339 | 6/1998 |
| DE | 197 27 153 | 11/1999 |
| EP | 0 118 098 | 2/1984 |
| GB | 2 000 734 | 1/1979 |
| WO | WO 99/45295 | 10/1999 |

\* cited by examiner

Fig.4.1 — Bus propulsion system, transverse axis, centered, angular drive 60° 65° right-hand traffic Fig.4.2 — Bus propulsion system, transverse axis, centered, angular drive 60° 65° left-hand traffic Fig.4.3 — Dropped floor propulsion systems, transverse, portal axis, affset, angular drive 80° right-hand traffic Fig.4.4 — Dropped floor propulsion systems, transverse, portal axis, offset, angular drive 80° left-hand traffic

US 6,969,336 B1

TRANSMISSION UNIT

BACKGROUND OF THE INVENTION

The invention concerns a transmission unit, specifically with the characteristics as described in the preamble to claim 1. Transmission units are known in a variety of different embodiments. One of the possible classification systems for transmissions relies the method chosen for speed/torque conversion. For example, the speed/torque transmission may be purely mechanical or may be combined with other conversion possibilities. Because the requirement of universal application of a transmission unit, i.e. the characteristics of its incorporation into vehicles, has become increasingly significant, angular drives are used to link output in various angles to the transmission input shaft in such transmission applications. A significant problem of this method is that such transmissions constructed as combinations of units will tend to be very large, due to the required incorporation of the elements of the angular drive and specifically the element connected on the output end of the unit; this size, in turn, leads to difficulty in incorporating the unit into vehicles, because the space available for the transmission unit is typically very limited.

Thus, the invention is based on the task of developing a transmission unit for use in vehicles with mechanical or combined torque transmission in such a manner that such a unit minimizes construction expense and space.

SUMMARY OF THE INVENTION

The solution according to this invention is characterized by a first bevel gear of the angular drive and an output transmission element having a direct and solid connection and located in immediate proximity to each other. The transmission element does not include any elements capable of generating axial forces to act against the housing cover on the housing wall.

The transmission unit according to one form of the invention includes a transmission input shaft and a transmission output shaft separated by a mechanical transmission unit. The mechanical transmission unit includes a transmission basic unit, which is also called base transmission, and an angular drive with a bevel gear drive, consisting of a first bevel gear and a second bevel gear, where the second bevel gear can be coupled to the transmission output shaft in an at least indirectly rotationally fixed manner, while the first bevel gear of this invention is in the immediate proximity of the output of the transmission basic unit and is directly coupled with this shaft, such that there is no intervening separate connecting shaft between the output shaft and the first bevel gear. Thus, the first bevel gear is not mounted on an extension of the shaft or is rotationally coupled with a shaft, which supports the transmission element that functions as output or which is connected to the same. Thus, the arrangement of shafts in the transmission basic unit is not modified. The transmission housing consists of at least one housing, which surrounds the transmission basic unit, which can be connected to a housing cover in the form of a transmission housing component that surrounds the angular drive at least in part. Thus, the transmission basic unit of the invention does not include elements that generate axial force that pushes against the housing cover on the housing wall, such as a piston that operates in the axial direction.

In a particularly advantageous embodiment, the transmission basic unit includes at least one cylindrical gear pair with two matching cylindrical gears or an epicyclic gear train, which includes at least one sun gear, one annulus, pinion gears and a bar, where one element of these transmission elements constitutes the output of the transmission basic unit. The output of the epicyclic gear train will then be formed, for example, by the annulus, the bar or the sun gear of the epicyclic gear train or by the spur gear matched to the pinion in the cylindrical gear pair. The first bevel gear forms here the input of the angular drive directly. There are essentially the following possibilities to achieve a rotationally fixed connection between the transmission element of the transmission basic unit that constitutes the output and the first bevel gear:

a. positive lock
b. non-positive lock
c. a combination of positive and non-positive lock The connection between positive and non-positive lock is made in the simplest case by mutually complementary driving elements on the transmission element that forms the output of the transmission basic unit and the first bevel gear, which may be brought into active connection. These are most advantageously situated in equal distances between the transmission element and the first bevel gear, viewed in the direction of the perimeter. The driving elements may here be embodied as claws, which insert into specifically designed recesses, or appropriately formed toothing.

There are essentially two basic configurations:

1. Inclusion of driving elements on the first bevel gear and/or the transmission unit, which forms the output of the transmission basic unit, and matching complementary driving elements, such as driving recesses on the transmission element, which forms the output of the transmission basic unit, and/or the first bevel gear seen in an axial direction relative to the direction of the transmission axle, specifically the transmission input axle, viewed in the installed position.

2. Inclusion of driving elements on the first bevel gear and/or the transmission unit, which forms the output of the transmission basic unit, and matching complementary driving elements, such as driving recesses on the transmission element, which forms the output of the transmission basic unit, and/or the first bevel gear seen in a radial direction relative to the direction of the transmission axle, specifically the transmission input axle, viewed in the installed position.

The driving elements and the associated recesses or complementary driving elements, which may also be designed as recesses, are here most advantageously situated in the area of the circumference of the first bevel gear and/or the transmission unit that forms the output of the transmission basic unit. The inclusion of the driving elements is accomplished here as follows:

1. On the inner circumference of the driving element, which forms the output, and the complementary driving element on the first bevel gear on the outer circumference of the first bevel gear, or 2. On the outer circumference of the driving element, which forms the output, and the complementary driving element on the inner circumference of the first bevel gear.

The two specified possibilities have the advantage that the realization of the rotationally solid connection between the angular drive and the output of the transmission basic unit is possible without any additional fastening measures, but simply by pushing it on, where the secure connection in an axial direction is generated simply by the linkage of the housing of the angular drive, where the first bevel gear is supported, and the housing of the basic transmission. This type of connection of the angular drive to the transmission basic unit is characterized by a very small space requirement, which has a particularly positive influence on the total length of the transmission unit.

An alternative embodiment of the invention could combine the angular drive, its housing and the required supports as a complete pre-fabricated unit with a transmission basic unit to an entire transmission unit. The possibility of removing the angular drive from the transmission basic unit as a modular unit creates the advantage that the transmission basic unit may be tested by itself even in the absence of the angular drive. However, the precondition is here that the transmission basic unit is designed such that its working elements for the various transmission elements to realize the several speed increments do not exert any axial force on the possible closure or housing cover for the basic transmission, but that these axial forces are already dissipated in the housing by an appropriate design. This means that the transmission unit is free of elements to generate axial forces that act directly on the transmission housing cover in the vicinity of the output of the transmission basic unit and the angular drive.

An especially advantageous embodiment realizes the solid connection of the first bevel gear with the annulus of a mechanical transmission unit that forms the output of the transmission basic unit. This embodiment may use particularly large diameters of the first bevel gear. This leads to a particularly short and compact design, given the resulting design of the second bevel gear, which connects to the first bevel gear.

The insertion and removal of the second bevel gear, which is linked to the output shaft, is preferably done by way of the level of the flange of the entire angular drive. The position of the angular drive elements is independent of the unit suspension of the output, i.e. the transmission output shaft, which is why the supports do not need to be adjusted at the flange connection of the angular drive.

The connection between the basic housing of the transmission basic unit and the housing of the angular drive to form the entire transmission unit is normally handled likewise by positive and/or non-positive locks. The housing for the angular drive may be either a single piece or, preferably, it may consist of multiple components.

In an additional embodiment of the invention, a set of angular drives in the form of bevel gear drives with a first bevel gear and a second bevel gear, where the gear ratio for all theoretically possible angles between the input of the angular drive and the output of the angular drive is constant and where the outside diameter of the individual bevel gears, namely the first and second bevel gears, are also held essentially constant, can be assigned to a single housing with identical external dimensions. The adjustment in the position of the output shaft, which is required by the various output angles, and the position of the supports will be realized most advantageously by support units that can be integrated into the housing and can be exchanged. Given the specified preconditions, i.e. different output angles for a set of transmission units with angular drives, where the gear ratio is essentially constant for all theoretically possible angles and where the diameter of the individual elements of the angular drive is essentially also constant with the set, the intersections of the flank lines with the transmission symmetry axis $S_G$ will cover a specific area in the axial direction for various angles, if viewed from the transmission symmetry axis $S_G$. This area determines the design of the transmission housing. In order to have a uniform entire transmission housing, including the housing for the angular drive, i.e. in order to use one transmission basic unit in multiple transmission applications with the same transmission housing, the housing surrounding the angular drive will be manufactured in such a standard design that it is suited to house all theoretically possible or desirable angular drives. The limits are pre-specified in this instance. However, generally the basic housing of the transmission housing is designed for the theoretically desirable case that the intersection of the flank lines of the bevel gears, when inserted into the transmission, is in close proximity to the base of the transmission housing, viewed in an axial direction. For example, this may be the situation for an angular drive with an angle of 90° or even more than 90°. The precise determination should be limited to what is theoretically feasible, where the practical construction feasibility also needs to be considered. It is most advantageous to design a housing suitable for angular drives of 60° to 90°. The outside contours of the transmission housing for various angular drives with the essentially constant gear ratio i and an identical outside diameters $d_A$ of the individual bevel gears will remain constant, while the adjustment to the specific angular drives is made by the means to support the second bevel gear, which forms the output of the transmission unit. Among others, this has the advantage that the connection elements for the housing surrounding the angular drive, at least in part, and the housing for the transmission basic unit for the entire set will have the same size, regardless of the size of the angle.

All kinds of toothing are possible for the toothing of the bevel gears.

In another embodiment of the invention, the cooling features, which are otherwise flanged to the cover of the basic transmission without an angular drive, are sited at the end of the angular drive. The required connecting lines will then no longer be handled by hoses, but are engraved as channels in the housing or may be incorporated there.

In a design of the angular drive with a single unit housing, i.e. with exchangeable interior supports and removable support of the second bevel gear on the transmission output shaft, i.e. the shaft that forms the output of the angular drive, it is feasible to design the second bevel gear in a different manner than for conventional embodiments. Here the transmission housing unit, which surrounds the angular drive, is first separated from the transmission basic unit and simultaneously the solid connection between the second bevel gear and the transmission output shaft is severed, so that the second bevel gear is rolled out of the cavity of the housing surrounding the angular drive, once the transmission output shaft is removed from the transmission housing. This makes it possible to shift the entire bevel gear drive further in the axial direction into the interior of the transmission housing, i.e. in the direction of the transmission input shaft, because an opening to remove the second bevel gear in the direction of the symmetrical axis of the transmission output shaft or on the housing wall with a feed-through for the transmission output shaft is no longer required. The designed feed-through in the transmission housing will then need to be sized only for the feed-through of the transmission output shaft.

The solution according to the invention is suited for any design of the transmission unit. Here it may be, for example, a purely mechanical transmission unit or a hydrodynamic-mechanical compound transmission.

BRIEF DESCRIPTION OF THE DRAWINGS

The solution of this invention is explained by use of Figures, which show the following:

FIGS. 4.1–4.4 show the possibilities to insert the transmission unit in bus propulsion systems with alternative requirements.

DETAILED DESCRIPTION

Figure 1:
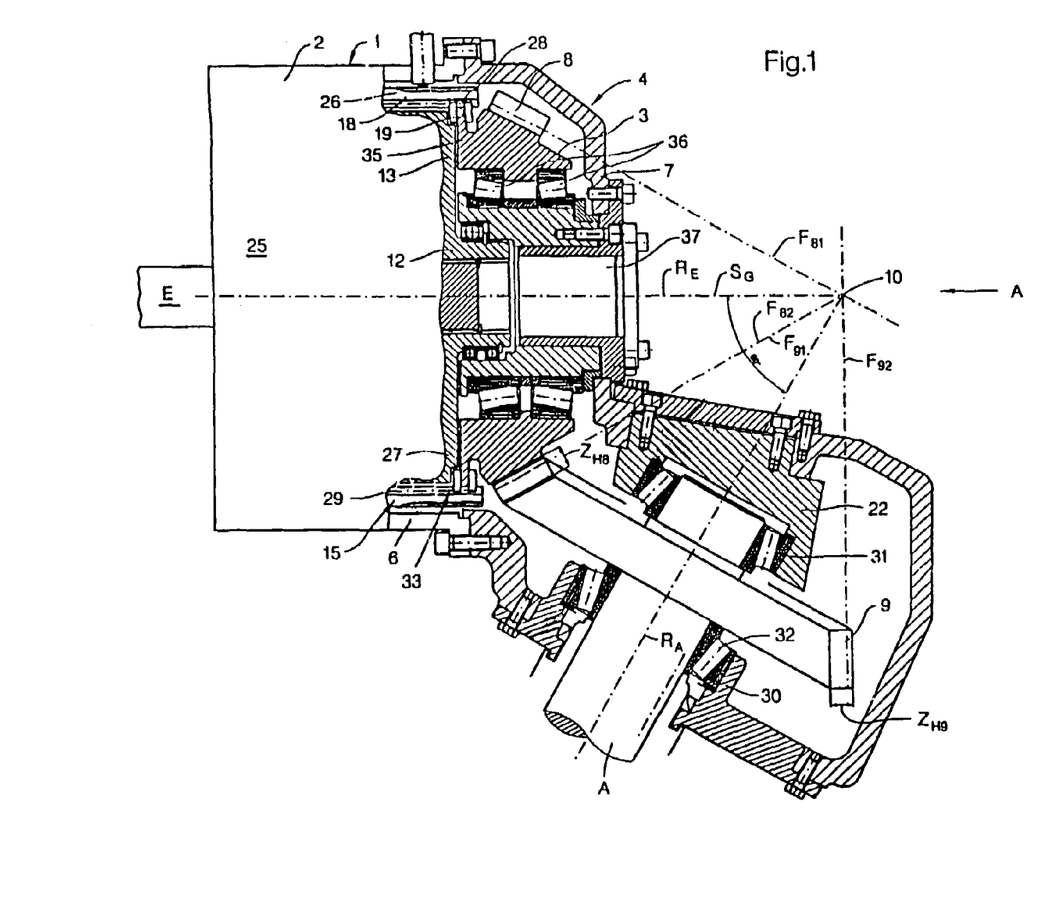
FIG. 1 shows a schematically simplified view of a transmission unit according to the design of the invention in an axial direction.

FIG. 1 shows the connection, which is designed according to the invention, of an angular drive 4 to the transmission basic unit 25, by reference to a segment of an axial cross section of transmission unit 1 in a schematically simplified view. Basic unit 25 may consist of a hydrodynamic and a mechanical transmission component. The transmission unit contains a transmission input shaft E and at least one transmission output shaft A. The transmission input shaft E and the transmission output shaft A are situated such that their theoretical axes of rotation $R_E$ and $R_A$ intersect at an angle. The transmission unit 1 contains at least one transmission basic unit 25, which is situated between the transmission input shaft E and the transmission output shaft A. The transmission basic unit 25 includes a mechanical transmission component 2 and a bevel gear drive 3 designed as an angular drive 4, which is connected to the transmission output shaft A. The transmission unit 1 also contains a transmission housing, which consists of at least two parts. In the present case, this includes at least one transmission base housing 6 and a transmission housing component 7, which surrounds the angular drive at least in part and which can be connected to transmission base housing 6. However, the transmission housing component 7 may consist of multiple components.

The angular drive 4, which consists of the bevel gear drive 3, contains at least two connected bevel gears, namely a first bevel gear 8 and a second bevel gear 9. The first bevel gear 8 is mounted coaxially to the transmission input shaft E. The second bevel gear 9, which has a solid connection to transmission output shaft A, is mounted at a certain angle to the first bevel gear 8.

The theoretical axes of rotation of the various bevel gears or their axes of symmetry, which correspond to the theoretical axes of rotation of the transmission input axis $R_E$ and the transmission output axis $R_A$, intersect in a point 10, which lies on the axis of symmetry of transmission unit 1. If the flank lines F of the toothing of the various bevel gears are projected onto a common plane E, they intersect with the transmission axis of symmetry $S_G$ in this same point. The flank lines are identified here as $F_{81}$, $F_{82}$, and $F_{91}$, $F_{92}$. It is most advantageous, if the toothing of the various bevel gears consists of straight line toothing. However, embodiments with diagonal toothing or arced toothing, where the flank lines are arcs, are also conceivable.

The arcs in bevel gears with arced flank lines may be circles, involutes, or epicycloids. In the case depicted here, the bevel gears have a constant tooth height $Z_{H8}$ and $Z_{H9}$.

The following description is based on the straight toothing shown in FIG. 1. This description applies by analogy to other toothing.

Angular drives 4 are designed for alternative angles between the transmission input shaft E and the transmission output shaft A for a specific transmission basic unit 25, where these angular drives are designed such that the individual flank lines for straight toothing or flank lines projected onto a plane with the transmission axis $S_G$ may form alternative angles with the transmission axis $S_G$. The various angular drives 4, which are suited theoretically for housing component 7, designed for alternative angles between the transmission input shaft E and the transmission output shaft A, which are characterized on the one hand by an essentially constant gear ratio between the individual bevel gears 8 or 9 and on the other hand by essentially constant external diameters of the individual bevel gears 8 or 9, will exhibit intersections of their flank lines $F_{81}$, $F_{82}$, $F_{91}$, $F_{92}$ with the transmission axis $S_G$ on a certain surface in an axial direction on transmission axis $S_G$. This surface determines the design of transmission housing 5 or the housing component 7 surrounding the angular drive. In order to achieve as uniform a housing 5 as possible, including the transmission housing component 7, for a transmission basic unit 1 with various output characteristics, i.e. with various angles between transmission output axis A and transmission input axis E, the second transmission housing component 7 is standardized such that it is capable of housing all theoretically possible or desired angular drives 4, where the angle between transmission input axis E and transmission output axis A acts as the only criteria of distinction, while the gear ratio and the outside diameter of the bevel gears are held constant for the various theoretically possible angles. The basic housing of transmission housing component 7 will therefore be designed for the two theoretical extreme cases, namely where the intersection 10 of the flank lines of bevel gears 8 or 9 of the bevel gear drive 3 is closest to transmission housing 5 and transmission housing component 7 in the axial direction or is furthest away from them. For example, the first extreme case may be the case of an angular drive 4 of 90° or even an angle of more than 90°. It is not necessary to make an exact determination, but it should remain in the theoretically possible range, with consideration given to the limitations imposed by production requirements. However, it is most advantageous to target for an angular drive with an angle between transmission input axis E and transmission output axis A in the range of 90° to <180°, where the angle <180° identifies the second extreme case. As was mentioned earlier, the outside dimensions for various angular drives 4 with essentially identical gear ratios i and the same outside diameters $d_A$ of the bevel gears 8 or 9 remain constant, while the adjustment to various angular drives, specifically the position of the supports, is accomplished through design or treatment of the inner surfaces of the housing, specifically housing component 7.

The tight linkage of the first bevel gear 8 and the elements of the mechanical transmission component 2, as shown in this invention, may be accomplished by various means. The preferred embodiment shown here was chosen with a connection characterized by a particularly compact design for the entire transmission unit 1, because the first bevel gear 8 may have a very large bevel gear diameter. The connection is achieved here by a transmission element of an epicyclic gear train 27 of the transmission basic unit 25, which is simultaneously the output 15 for the transmission basic unit 25 and thus the input for angular drive 4. The epicyclic gear train includes a sun gear 12, an annulus 26, pinion gears 13, and a bar 14. The annulus 26 of the epicyclic gear train 27 is the output 15 of the transmission. The linkage is achieved by a solid connection by positive and non-positive lock. The solid connection is labeled here as 33. It works by the connection of complementary driving elements 18 and 19 on annulus 26 and the first bevel gear 8. Thus, the bevel gear 8 is equipped with the corresponding exterior toothing 28, which can be connected to the complementary interior toothing 29 on annulus 26. It is preferable that the interior toothing 29 on annulus 26, which is included anyway, be used for this purpose. For this purpose, the annulus is designed to be elongated, when viewed in an axial direction as incorporated into transmission unit 1, such that, in addition to the pinion gears 34 of the epicyclic gear train 27, the annulus is connected to the exterior toothing 28 of bevel gear 8. For this purpose, bevel gear 8 has a corresponding exterior toothing 28 in a second segment 35, which is free of the bevel toothing.

Angular drive 4 is also associated with transmission housing component 7, which houses angular drive 4 and which forms an assembly unit with base housing 6, when installed. For installation as a prefab unit, the angular drive 4 has matching supports 36 and axis 37 for support, which is permanently installed in transmission housing component 7. Transmission housing component 7 may be manufactured as a single piece or it may consist of several pieces, as is shown in FIG. 1. The embodiment with several pieces is often preferred for ease of assembly.

An embodiment of the angular drive 4 as a modular unit has the advantage that this entire unit can then be integrated in a simple manner in the entire transmission unit 1. This is accomplished by pushing the outer toothing 28 and the inner toothing 29 of the annulus together. This is then secured against sideways movement in an axial direction by connecting the first bevel gear 8 to housing component 7 and then connecting housing component 7 to the transmission base housing 6 of transmission basic unit 25, which results in the entire transmission unit 1. Additional elements are not required to secure the unit.

Figure 2:
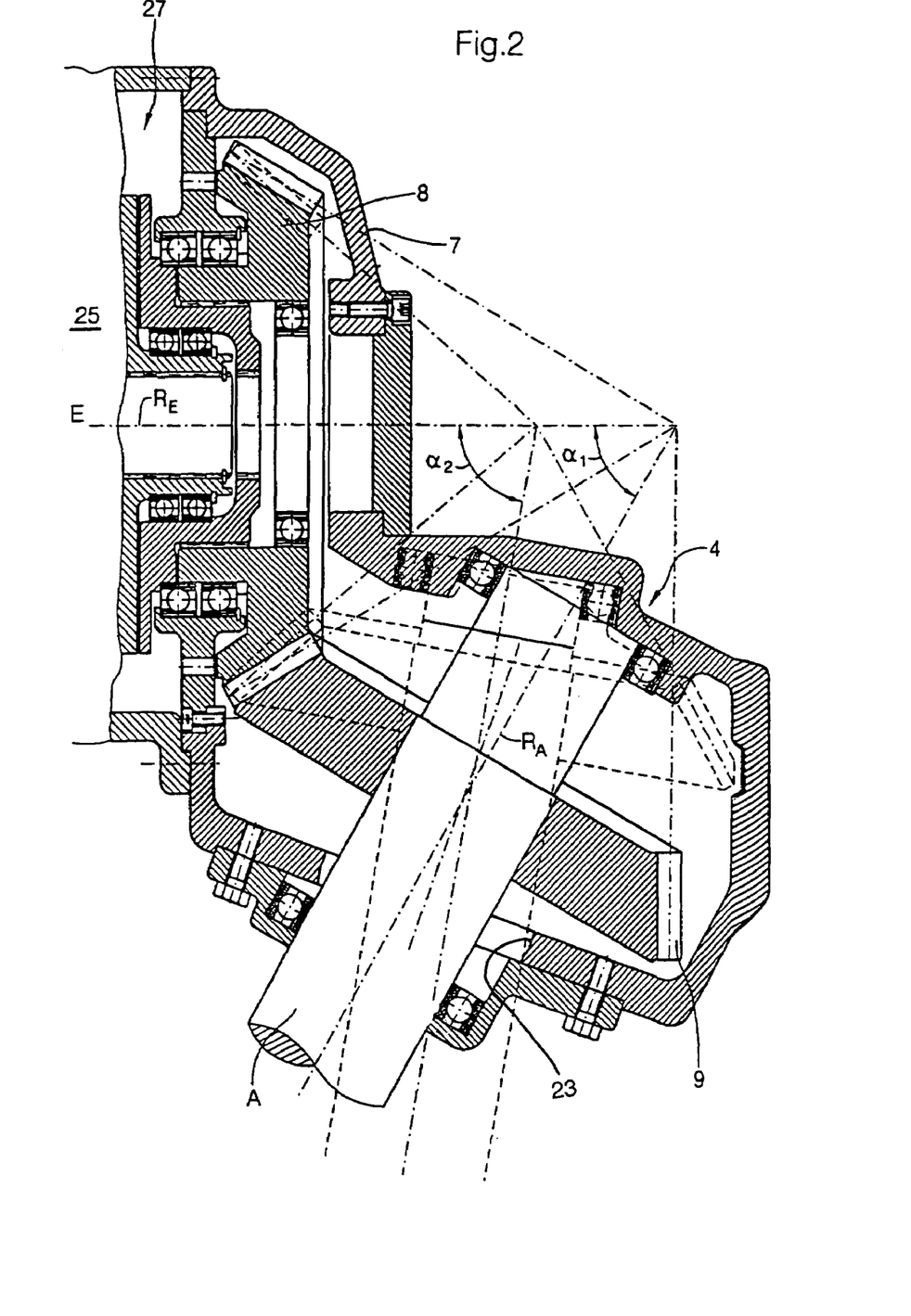
FIG. 2 shows a schematically simplified view of the support of transmission output shaft A for two alternative angles between the transmission input shaft and the transmission output shaft.

FIG. 2 presents a schematically simplified view of the support of transmission output shaft A for two different angles between the transmission input shaft E and the transmission output shaft A. The variation denoted by I corresponds to an angle $\alpha_1$ of 60° between the transmission input shaft E and the transmission output shaft A, whereas the variation denoted by II corresponds to an angle $\alpha_2$ of 80° between the transmission input shaft E and the transmission output shaft A.

Transmission housing component 7 also has a feed-through 23, which is the exit for transmission output shaft A. It is preferable that the feed-through be an opening of constant size for all housings 7. Here the maximum size corresponds to the entire range of angle $\alpha$, which could theoretically apply to transmission output shaft A.

Figure 3:
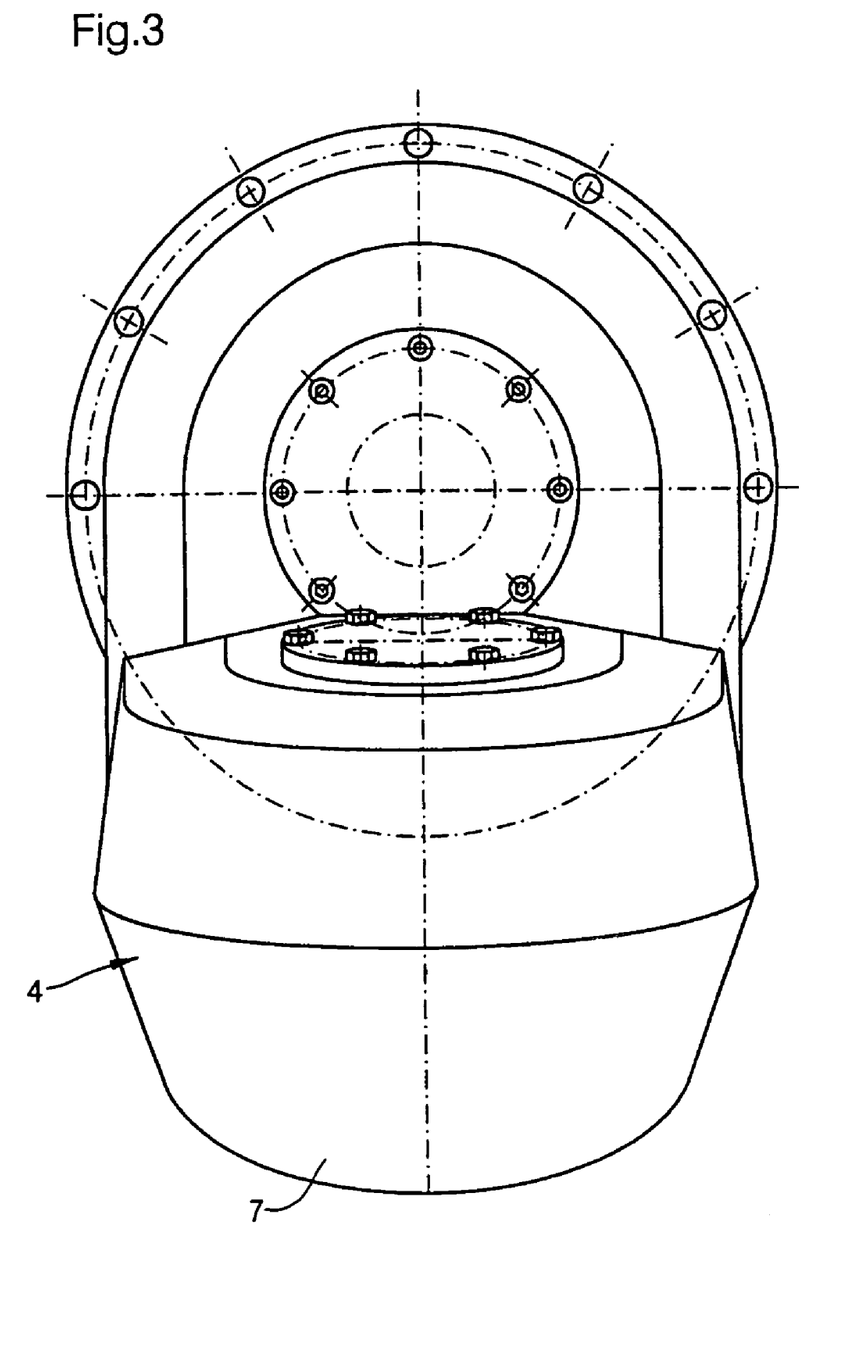
FIG. 3 shows the possibilities for adding the angular drive in a simplified view corresponding to view A in FIG. 1 or 2.

Transmission housing component 7 can be linked to transmission housing 8 by positive and/or non-positive locks. It is preferable that the linkage be fastened by screw and/or plug-type connectors. The recesses and holes in transmission base housing 6 and transmission housing component 7 required to achieve the linkage are preferably formed such that rotation, viewed along the circumference of transmission unit 1, is feasible, such that alternative placements of bevel gear drive 3 are possible, particularly with respect to placement of the second bevel gear 9 and thus the angular drive 4 relative to the assembly position of the transmission unit, and thus also in the position of transmission housing 5 relative to the latter. Possible positions are shown in FIG. 3 for a view A corresponding to FIG. 1 or 2. This possibility is of special significance, if transmission housing 5 has a particular structure that must be incorporated in a particular position. This is the case, whenever rills or channels for lubricants or the like must be included.

The embodiment of transmission housing component 7 described in FIGS. 1 and 2 also makes a different design of the second bevel gear 9 feasible, which differs from the conventional method. Whereas the second bevel gear 9 is removed in conventional embodiments in the direction of the axis of symmetry of transmission output shaft A, the embodiment of transmission housing component 7 according to this invention makes it feasible to remove transmission housing component 7 first from the remaining transmission housing 5, then to separate the transmission output shaft A from bevel gear 9 and to roll the same sideways out of the cavity 11 formed within transmission housing component 7. This makes it feasible to move the entire bevel gear drive 3 in an axial direction further into the interior of transmission housing component 7, because the transmission housing component 7 is no longer limited in size by the size of feed-through 23 of transmission output shaft A to a size that would also allow removal of the second bevel gear 9 in this direction.

Other possibilities to remove the second bevel gear 9 require a corresponding design of opening 23. This may be elliptical in an alternative embodiment for the feed-through of transmission output shaft A. The maximum dimension corresponds here to the outside diameter $d_A$ of the second bevel gear 9. The connection between transmission output shaft A and the second bevel gear 9 is severed first during removal and the second bevel gear 9 is led to the elliptical opening by tipping.

The design of transmission housing 5 as shown in FIGS. 1 to 3, particularly the design of transmission housing component 7, makes it feasible to use a common housing to enclose various angular drives 4. The output angle is determined only by the design or the assembly and finishing of the interior surfaces in the vicinity of the second bevel gear, which is connected to transmission output shaft A. The division of the housing into a transmission base housing 6 and a so-called transmission housing component 7 makes it feasible to move the angular drive 4 in an axial direction further towards the transmission input shaft compared to conventional embodiments. This very short shape thus applies across the plane of the connection of the entire angular drive. The described preferred embodiment enables a free design of the output side, which results in a short size that saves material. The transmission base unit may be tested without angular drive 4.

FIG. 4 exemplifies potential applications of a transmission unit 1 according to the invention with a uniform housing, consisting of transmission base housing 6 and transmission housing component 7, by means of examples. Here the term "transmission housing" should not be interpreted to require complete coverage, but the housing may have openings, which may in turn be closed by lid-shaped elements.

Figure 41:
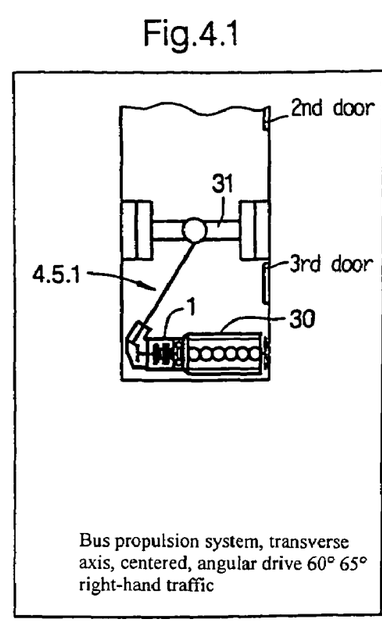

FIG. 4.1 shows the use of the transmission unit 1 according to the invention in a bus propulsion system with a transverse motor 30 to drive an axle 31, which is designed to be located between the second and third door of the bus. The motor 30 is connected to transmission unit 1 for the purpose of gearing torque/speed, where output shaft 32 of the mechanical transmission component is in a coaxial position relative to transmission input shaft E. The propulsion to the axle is provided here by angular drive 4.51 in the middle of axle 31. Here the angular drive 4.51 is mounted at an angle of 60° or 65°. This configuration is particularly useful for right-hand traffic.

Figure 42:
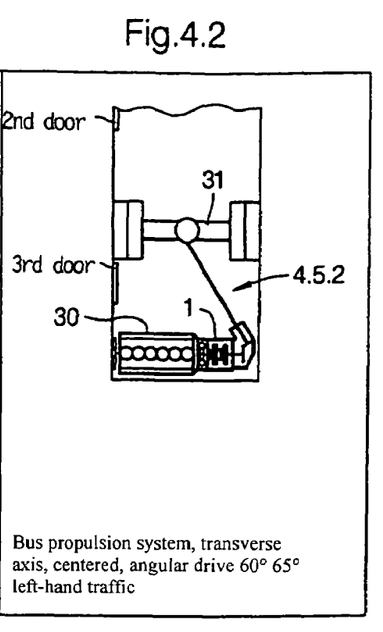

FIG. 4.2 shows an embodiment corresponding to FIG. 4.1 in a schematically simplified view by means of a top view of a bus propulsion system. The motor 30 is also mounted in a transverse position and the propulsion is likewise centered on the axle. The embodiment differs from that show in FIG. 4.1 by a change of the flow of torque between motor 30 and transmission 1. This embodiment is best suited to left-hand traffic.

Figure 43:
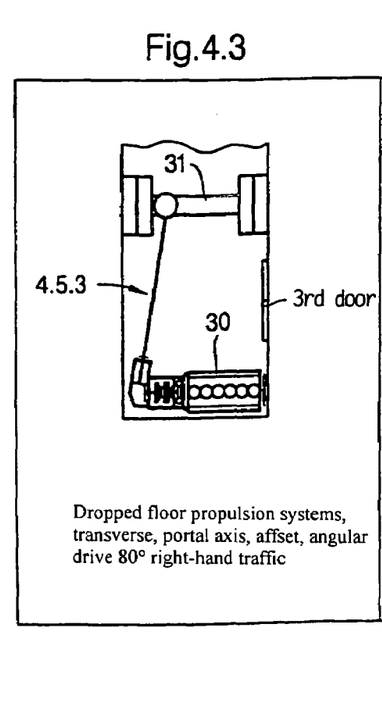
Figure 44:
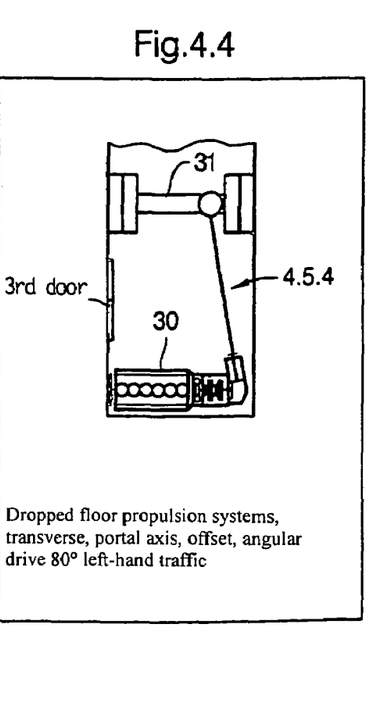

FIGS. 4.3 and 4.4 show embodiments in so-called dropped floor propulsion systems, where the motor 30 is again mounted transverse to the direction of travel and where the propulsion of the portal axle 31 is not centered, i.e. offset, by means of an angular drive 4.53 or 4.54. The embodiment in FIG. 4.3 is best suited for right-hand traffic and the embodiment in FIG. 4.4 is best suited for left-hand traffic. The angle between transmission input shaft E and transmission output shaft A is here 80°.

LISTING OF REFERENCE IDENTIFICATIONS

E Transmission input shaft
A Transmission output shaft
1 Transmission unit
2 Mechanical transmission component
3 Bevel gear drive
4 Angular drive
5 Transmission housing
6 Transmission base housing
7 Transmission housing component
8 First bevel gear
9 Second bevel gear
10 Intersection of axes of symmetry
11 Cavity
12 Sun gear
13 Pinion gear
14 Bar
15 Output of transmission
16 Exterior circumference of first bevel gear
17 Interior of annulus
18 Driving elements
19 Driving elements
23 Feed-through
25 Transmission basic unit
26 Annulus
28 Exterior toothing
29 Interior toothing
33 Solid connection
34 Pinion gears
35 Second segment of bevel gear
36 Support
37 Axis
$F_{81}$, $F_{82}$, and $F_{91}$, $F_{92}$ Flank lines of the toothing of the bevel gears

What is claimed is:

1. Transmission unit, comprising:
    a transmission input shaft (E) and a transmission output shaft (A), and a transmission basic unit (25) situated between transmission input shaft (E) and transmission output shaft (A), which is connected to an angular drive (4);
    the angular drive (4) including a bevel gear drive (3) with a first bevel gear (8) and a second bevel gear (9), where the second bevel gear (9) is solidly connected to the transmission output shaft, at least indirectly;
    a transmission housing (5) that includes at least a transmission base housing (6) that covers the transmission basic unit (25), and which is connected to a housing cover formed by a transmission housing component (7) which covers the angular drive (4) at least in part;
    the first bevel gear (8) of the angular drive (4) and a transmission element of the transmission basic unit (25), which constitutes the output (15) of the transmission basic unit (25), having a direct and solid connection without a separate connecting shaft and located in immediate proximity to each other;
    the transmission basic unit (25) not including any elements capable of generating axial forces to act against the housing cover;
    the solid connection consisting essentially of complementary driving elements, which may be brought to bear upon each other, on the transmission element functioning as the output (15) and the first bevel gear (8);
    the first bevel gear (8) of angular drive (4) supported within the transmission housing component (7);
    the transmission basic unit (25) including at least one epicyclic gear train (27) with at least one annulus (26), one sun gear (12) and pinion gears (13);
    the output (15) of transmission basic unit (25) consisting essentially of an element of the epicyclic gear train (27).

2. Transmission unit according to claim 1 including driving elements on the first bevel gear (8) and/or on the transmission element that forms the output (15) of the transmission basic unit (25) and the corresponding driving elements on the transmission element that forms the output (15) of the transmission basic unit (25) and/or the first bevel gear (8), which are oriented and positioned in an axial direction relative to the position of the transmission axis, specifically the transmission input shaft (E), as installed.

3. Transmission unit according to claim 1 characterized by having driving elements on the first bevel gear (8) and/or on the transmission element that forms the output (15) of the transmission basic unit (25) and the corresponding driving elements on the transmission element that forms the output (15) of the transmission basic unit (25) and/or the first bevel gear (8), which are oriented and positioned radially relative to the transmission axis, specifically the transmission input shaft (E), as installed.

4. Transmission unit according to claim 3 wherein:
    the driving elements are positioned in the area of the interior circumference of the transmission element which forms the output (15) of the transmission basic unit;
    the driving elements complementary to the driving elements positioned in the area of the interior circumference are positioned on the first bevel gear (8) in the area of its external circumference (16).

5. Transmission unit according to claim 1 wherein the output (15) of the transmission basic unit (25) has a transmission element consisting essentially of a sun gear (12) of the epicyclic gear train (27).

6. Transmission unit according to claim 1 wherein the transmission basic unit (25) comprises a hydrodynamic and a mechanical transmission component.

7. Transmission unit according to claim 1 wherein the angular drive (4) and the housing component, which covers the angular drive at least partially, are combined into a modular unit.

8. Transmission unit according to claim 1 characterized by straight toothing in the toothing of the connected bevel gears.

9. Transmission unit according to claim 1 characterized by diagonal toothing in the toothing of the connected bevel gears of the bevel gear drive.

10. Transmission unit according to claim 8 characterized by identical height of the toothing of the bevel gears of the bevel gear drive.

11. Transmission unit according to claim 1, characterized by having driving elements on the first bevel gear (8) and/or on the transmission element that forms the output (15) of the transmission basic unit (25) and the corresponding driving elements on the transmission element that forms the output (15) of the transmission basic unit (25) and/or the first bevel gear (8), which are oriented and positioned in an axial direction relative to the position of the transmission axis, specifically the transmission input shaft (E), as installed.

12. Transmission unit according to claim 1, including having driving elements on the first bevel gear (8) and/or on the transmission element that forms the output (15) of the transmission basic unit (25) and the corresponding driving elements on the transmission element that forms the output (15) of the transmission basic unit (25) and/or the first bevel gear (8), which are oriented and positioned radially relative to the transmission axis, specifically the transmission input shaft (E), as installed.

13. Transmission unit according to claim 4 wherein:
the output (15) of transmission basic unit (25) consists essentially of an annulus (26) of an epicyclic gear train (27);
the driving elements consist essentially of an exterior toothing (28) on the first bevel gear (8) complementary to interior toothing (29) of an axially extending portion of the annulus (26), which does not connect to the pinion gears (13) and where the first bevel gear (8) has a segment (35) with no beveled toothing.

14. Transmission unit according to claim 3 characterized by the output (15) of the transmission basic unit (25) having a transmission element consisting essentially of a sun gear (12) of an epicyclic gear train (27).

15. Transmission unit according to claim 4 characterized by the output (15) of the transmission basic unit (25) having a transmission element consisting essentially of a sun gear (12) of an epicyclic gear train (27).

16. Transmission unit, comprising:
a transmission input shaft (E) and a transmission output shaft (A), and a transmission basic unit (25) situated between transmission input shaft (E) and transmission output shaft (A), which is connected to an angular drive (4);
the angular drive (4) including a bevel gear drive (3) with a first bevel gear (8) and a second bevel gear (9), where the second bevel gear (9) is solidly connected to the transmission output shaft, at least indirectly;
a transmission housing (5) that includes at least a transmission base housing (6) that covers the transmission basic unit (25), and which is connected to a housing cover formed by a transmission housing component (7) which covers the angular drive (4) at least in part;
the first bevel gear (8) of the angular drive (4) and a transmission element of the transmission basic unit (25), which constitutes the output (15) of the transmission basic unit (25), having a direct and solid connection without a separate connecting shaft and located in immediate proximity to each other;
the transmission basic unit (25) not including any elements capable of generating axial forces to act against the housing cover;
the solid connection consisting essentially of complementary driving elements, which may be brought to bear upon each other, on the transmission element functioning as the output (15) and the first bevel gear (8);
the first bevel gear (8) of angular drive (4) supported within the transmission housing component (7);
driving elements on the first bevel gear (8) and/or on the transmission element that forms the output (15) of the transmission basic unit (25) and the corresponding driving elements on the transmission element that forms the output (15) of the transmission basic unit (25) and/or the first bevel gear (8), which are oriented and positioned radially relative to the transmission axis, specifically the transmission input shaft (E), as installed;
the output (15) of transmission basic unit (25) consisting essentially of an annulus (26) of an epicyclic gear train (27);
the driving elements consisting essentially of an exterior toothing (28) on the first bevel gear (8) complementary to interior toothing (29) of an axially extended portion of the annulus (26), which does not connect to the pinion gears (13) and where the first bevel gear (8) has a segment (35) with no beveled toothing.

17. Transmission unit, comprising:
a transmission input shaft (E) and a transmission output shaft (A), and a transmission basic unit (25) situated between transmission input shaft (E) and transmission output shaft (A), which is connected to an angular drive (4);
the angular drive (4) including a bevel gear drive (3) with a first bevel gear (8) and a second bevel gear (9), where the second bevel gear (9) is solidly connected to the transmission output shaft, at least indirectly;
a transmission housing (5) that includes at least a transmission base housing (6) that covers the transmission basic unit (25), and which is connected to a housing cover formed by a transmission housing component (7) which covers the angular drive (4) at least in part;
the first bevel gear (8) of the angular drive (4) and a transmission element of the transmission basic unit (25), which constitutes the output (15) of the transmission basic unit (25), having a direct and solid connection without a separate connecting shaft and located in immediate proximity to each other;
the transmission basic unit (25) not including any elements capable of generating axial forces to act against the housing cover;
the solid connection consisting essentially of complementary driving elements, which may be brought to bear upon each other, on the transmission element functioning as the output (15) and the first bevel gear (8);
the first bevel gear (8) of angular drive (4) supported within the transmission housing component (7); and wherein:
the transmission housing component (7) which encloses the transmission unit at least in the area of the angular drive (4) is designed for all theoretically possible angular drives with the following characteristics:
the gear ratio i is essentially constant,
the outside diameters of the various bevel gears are essentially constant, and
the housing component has the same exterior dimensions, whereby various position angles for the transmission output shaft (A) may be realized by an exchangeable apparatus to support the second bevel gear (9) and/or the transmission output shaft (A).

18. Transmission unit according to claim 17 wherein the transmission housing component (7) consists essentially of a single housing.

19. Transmission unit, comprising:
a transmission input shaft (E) and a transmission output shaft (A), and a transmission basic unit (25) situated between transmission input shaft (E) and transmission output shaft (A), which is connected to an angular drive (4);
the angular drive (4) including a bevel gear drive (3) with a first bevel gear (8) and a second bevel gear (9), where the second bevel gear (9) is solidly connected to the transmission output shaft, at least indirectly;
a transmission housing (5) that includes at least a transmission base housing (6) that covers the transmission basic unit (25), and which is connected to a housing cover formed by a transmission housing component (7) which covers the angular drive (4) at least in part;

the first bevel gear (8) of the angular drive (4) and a transmission element of the transmission basic unit (25), which constitutes the output (15) of the transmission basic unit (25), having a direct and solid connection without a separate connecting shaft and located in immediate proximity to each other;

the transmission basic unit (25) not including any elements capable of generating axial forces to act against the housing cover;

the solid connection consisting essentially of complementary driving elements, which may be brought to bear upon each other, on the transmission element functioning as the output (15) and the first bevel gear (8);

the first bevel gear (8) of angular drive (4) supported within the transmission housing component (7);

the output (15) of the transmission basic unit (25) having a transmission element consisting essentially of a sun gear (12) of an epicyclic gear train (27).

* * * * *